Figure 1:
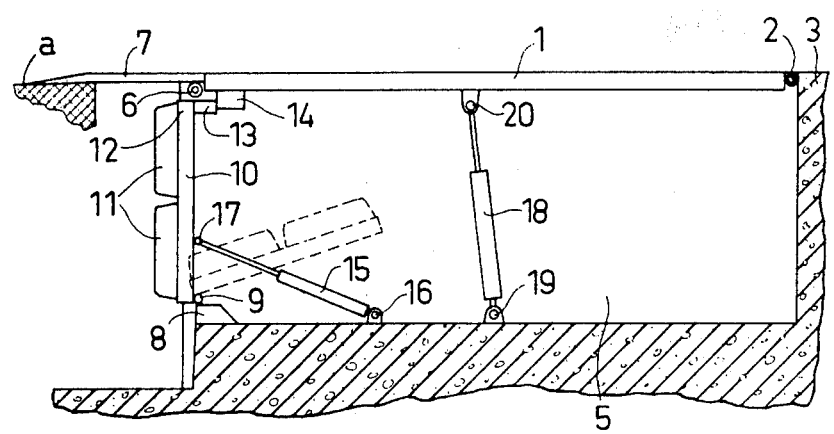

United States Patent [19]

Alten

[11] 4,420,849
[45] Dec. 20, 1983

[54] RAMP BRIDGING DEVICE

[76] Inventor: Kurt Alten, Ringstr. 14, D-3015 Wennigsen, Fed. Rep. of Germany

[21] Appl. No.: 254,615

[22] Filed: Apr. 16, 1981

[30] Foreign Application Priority Data

Apr. 24, 1980 [DE] Fed. Rep. of Germany ....... 3015717

[51] Int. Cl.³ .............................................. E01D 1/00
[52] U.S. Cl. ..................................... 14/71.3; 14/71.1
[58] Field of Search ....................... 14/71.1, 71.3, 71.7

[56] References Cited

U.S. PATENT DOCUMENTS

| 3,064,289 | 11/1962 | Burch et al. | 14/71.3 |
| 3,075,213 | 1/1963 | Loomis | 14/71.3 |
| 3,203,019 | 8/1965 | Le Clear | 14/71.3 |
| 3,530,488 | 9/1970 | Beckwith | 14/71.3 |
| 4,224,709 | 9/1980 | Alten | 14/71.3 |

Primary Examiner—James A. Leppink
Assistant Examiner—Beverly E. Hjorth
Attorney, Agent, or Firm—Becker & Becker, Inc.

[57] ABSTRACT

A ramp bridging device including a pivotable bridge plate and an extensible extension portion. Stop buffers, pivotable between a vertical operative position and an inoperative position beneath the bridge plate, are provided for protecting the plate and the extension portion. In the operative position, the upper free end of the stop buffers are braced against the bridge plate.

4 Claims, 2 Drawing Figures

U.S. Patent  Dec. 20, 1983  4,420,849

RAMP BRIDGING DEVICE

The present invention relates to a ramp bridging device having buffer members for absorbing impact forces acting on the device.

A known bridging device of this type comprises a ramp bridging device comprising a bridge plate having a rear end pivotally mounted about a horizontal axis formed on a surface defining a recess to be bridged, the bridge plate having an extensible and retractable extension portion connected to the free end thereof. The extension portion is locatable on a platform to be loaded or unloaded, and the device further includes stop buffers disposed laterally of the bridge plate. The stop buffers are pivotable between an operative, substantially vertical position in which the buffers project forwardly of the free end of the bridge plate and the retracted extension portion, and an inoperative position in which the stop buffers are disposed beneath the bridge plate. Such bridging devices generally have a stop buffer which, in its operative position, is supported on a rod located at the rear of the device. This rod is both costly to produce, and is easily damaged by the vehicles to be loaded or unloaded. This is because the stop buffer must be pivotable rearwardly. As this rearward movement is essential, it can be seen that the provision of an appropriate solid, rigid rod is difficult to realize in practice.

It is therefore an object of the present invention to provide a bridging device in which a satisfactorily solid support for the stop buffer is provided, but which does not hinder the rearward pivotal movement of the stop buffer when the bridge is in its operational position or other occasions when the stop buffer is no longer required.

Figure 2:
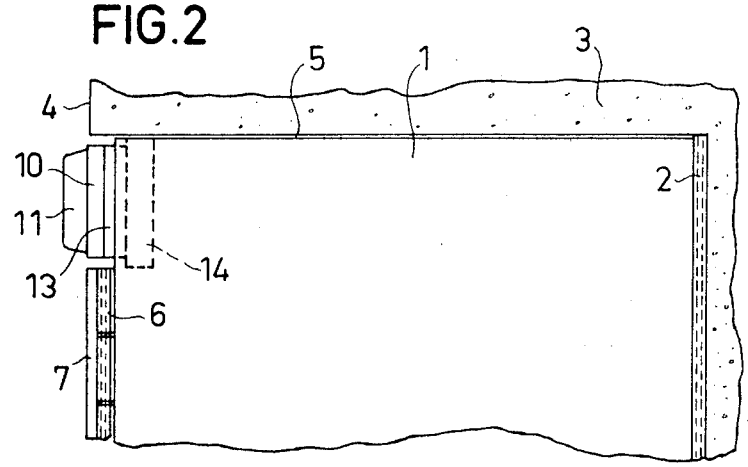

This object, and other objects and advantages of the present invention, will appear more clearly from the following specification in connection with the accompanying drawing, in which:

FIG. 1 shows a side elevational view of the bridging device in accordance with the present invention in a particular operative position, and FIG. 2 is a partial plan view of the bridging device shown in FIG. 1 in its inoperative position, but with one portion of the device, namely a stop buffer, still being in its operative position.

The ramp bridging device of the present invention is characterized primarily in that the upper free end of each buffer is, in its vertical operational position, supported by the bridge plate.

According to further features of the present invention, a support member may be formed on the underside of the bridge plate to form an abutment member for the free end of the stop buffer.

The support for the stop buffer may be such that the stop buffers automatically or spontaneously in a self-action manner pivot rearwards from their operative position to their inoperative position when the bridge plate is pivoted in an upward direction to move said support out of abutment with said stop buffer.

The stop buffers may be pivotable from their inoperative position into their operational position as a function of the location of the bridge plate.

The stop buffers may be pivotable into their operational position before the bridge plate is pivotally moved from an operational position, in which it extends obliquely upwardly, into a horizontal position.

The stop buffers may each include a rearwardly facing projection by means of which the stop buffer is supported or in bracing engagement against the bridge plate.

The stop buffer is thus braced or supported, in use, at its upper end, and is pivotally mounted on a fixed member at its lower end. It appears that the provision of such an arrangement obviates the disadvantages of the known devices. When the bridging device is in its operational position, that is to say, when the bridge plate and extension portion are pivoted into position, the support, which is no longer required, is usually moved away from the stop buffer. The stop buffer can now pivot rearwardly into its inoperative position. This may be effected automatically or spontaneously, for example, by using suitable springs. The support, therefore, moves with the bridge plate. This change of location of the support may be permitted because once the bridge plate is in its operational position, the laterally disposed stop buffers would only constitute a hindrance.

Referring now to the drawing in detail, FIG. 1 shows a substantially rectangular bridge plate 1 which is pivotally mounted at its rear end about a horizontal axis 2 formed on a surface 3 defining a recess 5 to be ramped or bridged. The bridge plate 1 can be pivoted upwardly or downwardly from the horizontal position as shown in FIG. 1. The upper front edge of the lateral wall defining recess 5 is referenced 4. The bridge plate 1, when pivoted downwardly, can be located in the recess 5.

An extensible and retractable extension portion 7 is pivotally mounted on the front, free end of the bridge plate 1 about a horizontal pivot axis 6. In its inoperative position, the extension portion 7 is usually pivoted so as to extend substantially vertically as shown in FIG. 2. In its operative position, the extension portion 7 is extended as shown in FIG. 1 so as to be locatable on a platform a to be loaded or unloaded.

A pivot axis 9, on which a stop buffer 10 is pivotally mounted, is provided on a bearing or support 8 which is located on the front edge of the base of the recess 5. The stop buffer is provided with two rubber pads 11 which, in the operational position of the buffer, face away from the pivot axis 2, the buffer 10 extending substantially vertically in such case. On the free end 12 of the stop buffer 10, remote from the axis 9, a projection 13 is provided. In the inoperative position of the bridging device, or in the particular operational position shown in FIG. 1 in which the device is in a condition in which the surface of the bridge plate 1 is extending substantially horizontally, the projection 13 abuts against a support or abutment 14 which is located beneath the bridge plate 1 and is fixedly connected thereto. The buffer 10 cannot, therefore, pivot rearwardly when in its operative position. The provision of a horizontal pivot axis 9 permits the stop buffer 10 to be pivoted from its vertical operational position into a rearward position, illustrated in dashed lines. It will be observed that the stop buffer is inclined rearwardly in this position and is located in the recess 5 with its free end, which carries the projection 13, being located above the axis 9. This pivoting can be effected by various means. For example, a working cylinder 15 may be provided, which is pivotally mounted about a horizontal axis formed in a bearing or support 16 located on the base of the recess 5. The cylinder 15 is pivotally connected to the stop buffer 10 at 17. The working cylinder 15 can be controlled or actuated by the same means which are utilized for controlling the extension portion 7 and/or the bridge plate 1. It is preferable to ensure that the drive system for the stop buffer 10 is such that the buffer 10 automatically or spontaneously pivots rearwardly when the bridge plate 1 is moved from its operative position, or the particular operative position shown in FIG. 1. In the embodiment shown, this requirement is achieved because, as the bridge plate is raised, the support 14 is moved out of abutment with the projection 13, and the stop buffer 10 is thereby free to pivot. A spring force on the stop buffer 10 could then be applied, or the working cylinder 15 could effect a rearward movement.

The extension portion 7 does not extend, in width, to the lateral edges of the bridge plate 1. Instead, a space is left for two stop buffers 10, one being located on each side of the bridging device, the stop buffers 10 protruding in front of the front end of the bridge plate 1, or in front of the extension portion 7 when it is retracted, so as to provide effective protection for these members. When both stop buffers 10 are in their vertical position, the bridge plate 1 can be pivoted downwardly into the recess 5 if the platform a to be loaded or unloaded is located at a low level relative to the axis 2.

When the stop buffers 10 are in their operational position, as in FIG. 1, they can absorb impact forces or the like due to their abutment against the support 14. Accordingly, any impact forces on the bridge plate are absorbed by the buffers 10. However, when the bridge plate is pivoted, the support 14 for the stop buffer 10 moves with it so that the stop buffer 10 can pivot into its concealed, non-operational position.

The pivotal movement of the bridge plate 1 can be effected by means of a lifting cylinder 18 which is provided with a bearing support 19 at its lower end, the upper end thereof being attached at 20 to the bridge plate 1.

It is also important that the movement and control of the stop buffer 10 is such that it is in its vertical operational position when the bridge plate 1 is to be pivoted downwardly from an inclined position into its normal operational position shown in FIG. 1. To enable the support 14 to support the stop buffer 10, the free end of the bridge plate 1 must be located above the ramp surface when the stop buffer is in its vertical position, so that when the bridge plate 1 is lowered, it is in the position shown in FIG. 2.

It will be readily appreciated that FIG. 1 shows a particular operational position of the device. Normally, however, the platform a to be loaded or unloaded will be so located that the bridge plate 1 does not extend substantially horizontally. In such a case, the device is operated in the following manner. The bridge plate 1 is caused to adopt a substantially horizontal position (the extension portion 7 still being retracted) and the stop buffer 10 is pivoted into its vertical, operative, position. The platform a to be loaded or unloaded is usually the floor of a truck. The truck is reversed so as to approach the plate 1. If the truck accidentally reverses into the bridging device, it will strike against the buffers 10 and not damage the bridge plate 1 or the extension portion 7. The platform is then locaed in its desired position which, for the sake of example, will be assumed to be located above the level of the axis 2.

Once the platform a is in position, the bridging device is almost ready for use, and the buffers 10 have already served their purpose. Accordingly, the bridge plate 1, with the extension portion 7 still retracted, is pivoted upwardly until the free end thereof is located above the platform a. By so doing, the abutment member 14 on the plate 1 is moved out of abutment with the projection 13 on the rear face of the buffer 10, which latter is now free to pivot rearwardly into the position shown in dashed lines in FIG. 1. The extension portion 7 is then extended, and the bridge plate and extension portion are lowered until the extension portion 7 is located on the platform a.

The present invention is, of course, in no way restricted to the specific disclosure of the specification and drawing, but also encompasses any modifications within the scope of the appended claims.

What I claim is:

1. A ramp bridging device, the ramp having therewith means forming a recess delimited by a rear surface and a base surface, said device comprising in combination:
    a bridge plate having a rear end and a forward end, said rear end of said bridge plate being pivotally mounted on said rear surface of said ramp so as to be pivotable about a horizontal axis;
    an extension portion mounted on said forward end of said bridge plate, said extension portion being extensible and retractable with respect to said bridge plate and being locatable, in said extended state, on a platform to be loaded on unloaded; and
    stop buffers pivotably mounted on said base surface of said recess and extending laterally of said extension portion of said bridge plate, said stop buffers being pivotable between a first operative position wherein said stop buffers extend substantially vertically, and a second inoperative position wherein said stop buffers are located in said recess below said bridge plate, whereby in said first operative position, said stop buffers protrude forwardly of said forward end of said bridge plate, said stop buffers respectively including an upper free end, said bridge plate being provided with an abutment for the free ends of said stop buffers during bracing engagement thereagainst, when said stop buffers are located in said first operative position, to prevent movement of said stop buffers to said second inoperative position, said bridge plate including a bottom surface, an abutment member being provided on, and directed away from, said bottom surface, to engage the stop buffers accordingly directly as to the free end though also slightly below the upper free end thereof, said abutment member effecting the bracing engagement of said stop buffers when said stop buffers are located in said first operative position.

2. A ramp bridging device in combination according to claim 1, in which said stop buffers pivot from said first operative position to said second inoperative position when said bridge plate is pivoted in such a way as to cause bracing engagement of said stop buffers against said abutment member on said bridge plate to be removed.

3. A ramp bridging device in combination according to claim 1, additionally comprising means for pivoting said stop buffers from said second inoperative position to said first operative position.

4. A ramp bridging device in combination according to claim 1, in which said stop buffers respectively include a rearwardly facing surface and projections on said rearwardly facing surface, said projections being engageably braced against said abutment member on said bridge plate when said stop buffers are in said first operative position.

* * * * *